United States Patent [19]

Rugen et al.

[11] Patent Number: 4,865,134
[45] Date of Patent: Sep. 12, 1989

[54] ADJUSTABLE LENGTH STRUT AND TRACTOR LINKAGE

[75] Inventors: Hermann Rugen, Meppen/Rühle; Alfred Frackenpohl, Lohmar; Paul Herchenbach, Ruppichteroth, all of Fed. Rep. of Germany

[73] Assignee: Jean Walterscheid GmbH, Lohmar, Fed. Rep. of Germany

[21] Appl. No.: 215,206

[22] Filed: Jul. 5, 1988

[30] Foreign Application Priority Data

Jul. 9, 1987 [DE] Fed. Rep. of Germany ....... 3722621

[51] Int. Cl.$^4$ .......................................... A01B 59/041
[52] U.S. Cl. ................................... 172/450; 248/354.5
[58] Field of Search ................. 172/450, 439, 449; 248/354.5

[56] References Cited

U.S. PATENT DOCUMENTS 3,356,330 12/1967 Rambelle ........................ 248/354.5

FOREIGN PATENT DOCUMENTS

| 3505243 | 8/1986 | Fed. Rep. of Germany . |
| 71669 | 2/1916 | Switzerland ...................... 248/354.5 |
| 512604 | 9/1939 | United Kingdom ............. 248/354.5 |
| 647622 | 12/1950 | United Kingdom ............... 172/450 |
| 2103064 | 8/1981 | United Kingdom ............... 172/450 |

Primary Examiner—Richard J. Johnson
Attorney, Agent, or Firm—Toren, McGeady & Associates

[57] ABSTRACT

An adjustable length strut 24 for laterally supporting each lower steering arm 12, 14 of a three point linkage on an agricultural tractor comprises a sleeve 26 within which a shaft is telescopically slidable, the two parts being biased inwardly towards one another by a tension spring 40. The shaft 28 is provided with axially spaced through bores 52, 54, 56 each alignable with a corresponding through bore 58, 60 or 62 in the sleeve 26. The longitudinal axes of each alignable set of bores extends at different angles of inclination to one another whereby a locking pin 64 may only be insertable through one specific set of aligned bores.

8 Claims, 3 Drawing Sheets

ADJUSTABLE LENGTH STRUT AND TRACTOR LINKAGE

BACKGROUND TO THE INVENTION

Field of the Invention

This invention relates to an adjustable length strut for laterally supporting one or both of the lower steering arms of a three point linkage of an agricultural tractor, the linkage being utilised to attach an agricultural implement to the tractor. Such a strut comprises an outer member, or sleeve, and an inner member telescopically engaged with one another wherein the two members are lockable relative to one another in certain positions by means of spaced bores provided therein which are capable of being aligned relative to one another for locking by a pin inserted into the aligned bores. One of the members is connectable to the tractor and the other of such members is connectable to a said lower steering arm.

With known struts of this type, the inner and outer members are provided with axially spaced bores through which the locking pin may be inserted but, in such designs, all of the bores extend through the members in a common plane, e.g. a vertical plane, which also passes through the longitudinal axis of the strut. The bores in the outer member are equidistantly axially spaced apart longitudinally thereof as are the bores in the inner member but the axial distances between adjacent bores in the outer member are different to the corresponding distances between the bores in the inner member. This arrangement permits a large number of lockable positions wherein sets of bores in the outer and inner members re alignable with one another thus providing a vernier type of adjustment as between the inner and outer members.

Although the type of adjustable length strut described above permits a large number of adjustments in length, it is left to the user i.e. the farmer to find the correct position which has to be set. As a rule, only a relatively small number of positions are required for coupling the lower steering arms to the corresponding implement which means that the user has to find the correct adjustment position for the struts by trial and error. However, if the incorrect length of strut is set, it is possible that the lower steering arms may run up against their stops when the associated lifting device is actuated thus leading to possible damage. It will be appreciated that the object of providing lateral struts is to set a predetermined horizontal distance between the ends of the lower steering arms for the purposes of coupling them to the implement but, in addition, the struts are also intended to limit the lateral deflection of the implement and to permit adjustment of the implement relative to the direction of traction.

SUMMARY OF THE INVENTION

It is an object of the present invention to provide an adjustable length strut and a three point linkage including such a strut which permits the adjustment of the lower steering arms of the linkage to predetermined positions whilst overcoming the disadvantages associated with the known prior art struts.

In accordance with the invention there is provided an adjustable length strut for laterally supporting a lower steering arm of a three point linkage of an agricultural tractor comprising inner and outer elongate members telescopically and non-rotatably engaged with one another, one of such members being securable to the tractor and the other of such members being securable to a said steering arm, said members being provided with a plurality of axially spaced through bores with the axial spacing between the bores in the inner member being different from the axial spacing between the bores in the outer member, corresponding sets of respective said bores in the inner and outer members being alignable with one another to receive a locking pin extending through said members for securing them together against relative axial movement, the longitudinal axes of each said alignable set of bores extending through said members at different angles of inclination.

Also in accordance with the invention there is provided a three point linkage for an agricultural tractor comprising two laterally spaced lower steering arms securable to the tractor and at least one adjustable length strut laterally supporting a said steering arm and being connected between a said steering arm and a tractor, said strut comprising inner and outer elongate members telescopically and non-rotatably engaged with one another, one of such members being securable to the tractor and the other of such members being securable to a said steering arm, said members being provided with a plurality of axially spaced through bores with the axial spacing between the bores in the inner member being different from the axial spacing between the bores in the outer member, corresponding sets of respective said bores in the inner and outer members being alignable with one another to receive a locking pin extending through said members for securing them together against relative axial movement, the longitudinal axis of each said alignable set of bores extending through said members at different angles of inclination.

The design of strut described in the two preceding paragraphs ensures that only one set of bores in the inner member and one set of bores in the outer member are alignable relative to one another for insertion of the locking pin. A further advantage of this design in accordance with the invention is that, as a result of the positive association of sets of bores with one another, it is also possible to achieve variations in overall length of the strut which are smaller than the actual bore diameter.

The inner and outer members of the strut are preferably spring biased axially towards one another by means of a tension spring incorporated within the strut whereby, when the locking pin is removed from an aligned set of bores, the inner and outer members are telescopically urged together biasing the strut to its shortest possible overall length.

The inner and outer members are conveniently each provided with inter-engaging axially extending formations preventing relative rotation between said members. Such formations may comprise a pair of diametrically opposed recesses extending axially of the outer member substantially parallel to the longitudinal axis thereof with corresponding projections provided on the inner member.

BRIEF DESCRIPTION OF THE DRAWINGS

Other features of the invention will become apparant from the following description given herein solely by way of example with reference to the accompanying drawings wherein.

DESCRIPTION OF PREFERRED EMBODIMENTS

Figure 1:
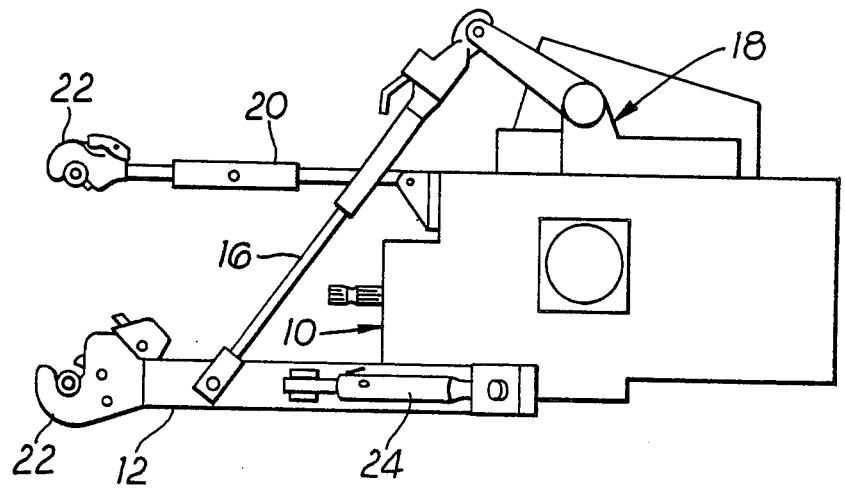
FIG. 1 is a diagrammatic side view of the rear end of a tractor and three point linkage incorporating an adjustable length lateral strut in accordance with the invention associated with each lower steering arm of the linkage.
Figure 2:
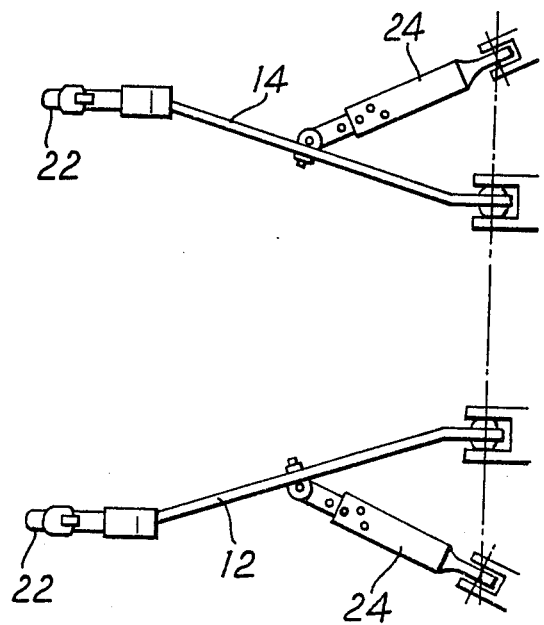
FIG. 2 is a diagrammatic plan view of the three point linkage shown in FIG. 1.

In FIGS. 1 and 2 of the drawings there is illustrated the rear end 10 of a tractor having a three point linkage mounted thereon for the attachment of an agricultural implement to the tractor. The three point linkage comprises a pair of lower steering arms 12 and 14 articulated to the rear end 10 of the tractor and including lifting struts 16 operated by, for example, hydraulic drive means 18 for raising and lowering the lower steering arms into or out of engagement with the implement. The three point linkage also includes an upper steering arm 20 articulated to the rear end 10 of the tractor.

Each of the steering arms 12, 14 and 20 includes a coupling hook 22 at its outer extremity for connection to a co-operating coupling pin or the like on an implement.

Each of the two lower steering arms 12 and 14 is associated with a respective adjustable length lateral strut 24 constructed in accordance with the invention. Each lateral strut 24 is connected between a lower steering arm 12 or 14 intermediate its ends and the rear end 10 of the tractor. As will be clearly seen from FIG. 2, each end of each strut 24 is hingedly connected to a lower steering arm and to the tractor respectively.

Figure 3:
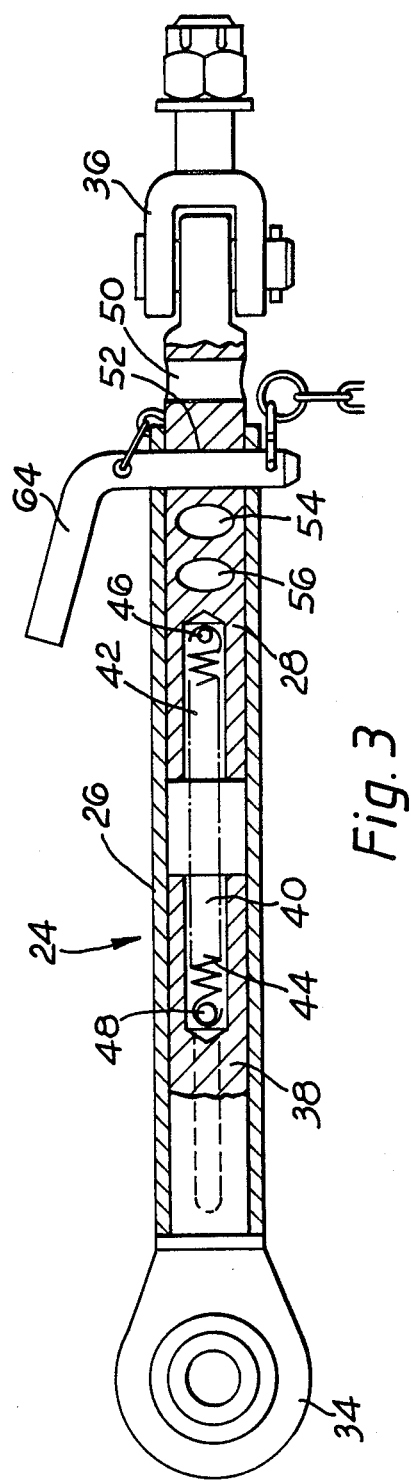
FIG. 3 is a side part cross sectional view through a strut in accordance with the invention.
Figure 4:
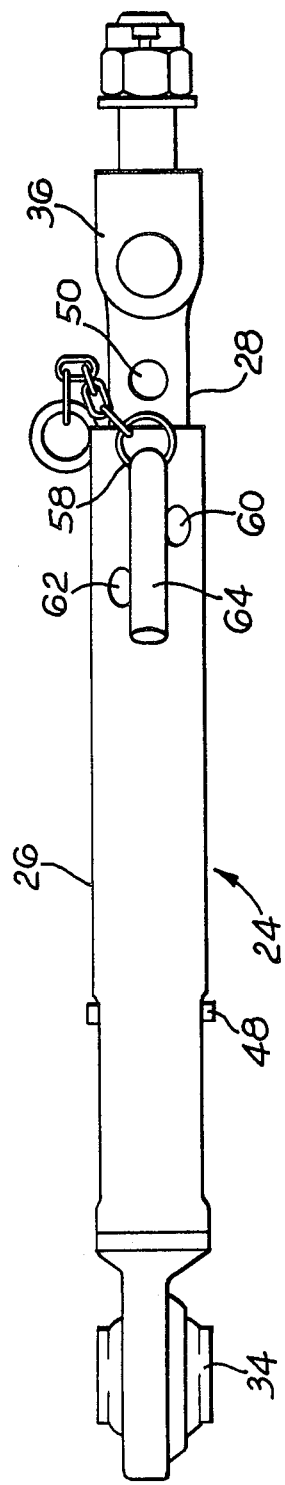
FIG. 4 is a plan view of the strut shown in FIG. 3.

Referring to FIGS. 3 and 4, it will be seen that the strut 24 comprises an outer tubular member, or sleeve 26, and an inner shaft member 28 telescopically engaged one within the other. The cross section of the sleeve and shaft is illustrated in FIGS. 5a, 6a and 7a from which it will be seen that the sleeve 26 is provided with two diametrically opposed recesses 30 extending substantially parallel to one another and to the longitudinal axis of the sleeve with the shaft 28 being provided with corresponding projections 32 engaged within such recesses. The shaft 28 is thus telescopically axially movable relative to the sleeve 26 but is non-rotatable relative thereto. Alternatively, the non-rotatable engagement between the shaft 28 and the sleeve 26 may be attained by arranging for the hinge connections 34 and 36 provided respectively at the outer ends of the sleeve and shaft to be in planes perpendicular to one another as shown in FIGS. 3 and 4.

The outer end of the sleeve 26 is provided with the connections 34 having a substantially cylindrical extension spigot 38 engaged within the end of the sleeve. Such spigot 38 is provided with a pair of longitudinally extending projections engaged within the corresponding receses 30 in the sleeve to secure it in a non-rotatable manner relative to the sleeve.

The outer end of the shaft 28 is provided with an apertured bush connected by a hinge pin to a fork head thus providing a said hinge connection 36.

As can be clearly seen from FIG. 3, the sleeve 26 and the shaft 28 are spring biased axially towards one another by means of a tension spring 40 secured at each of its ends within axial bores 42 and 44 formed respectively in the shaft 28 and in the spigot 38; each end of the tension spring 40 being secured to a respective fixed pin 46 and 48.

As can be seen from FIG. 3, the shaft 28 is provided with four through bores 50, 52, 54 and 56 whereas, as can be seen from FIG. 4, the sleeve 26 is provided with three through bores 58, 60 and 62. The bores in the shaft 28 are axially spaced apart from one another, as are the bores in the sleeve 26, but the axial spacing between the bores in the sleeve and between the bores in the shaft is different. In FIGS. 3 and 4, a locking pin 64 is shown extending through one set of aligned bores 52 and 58 and, in accordance with the invention, the bore axes of the other sets of alignable bores 54-62 and 56-60 extend through the sleeve and shaft at different angles of inclination to one another. Thus, the aligned bores 52 and 58 within which the locking pin 64 is shown engaged in FIGS. 3 and 4 are vertical and pass through the longitudinal axis of the sleeve and shaft i.e. the longitudinal axis of the strut. Conversely, the other two sets of alignable bores in the sleeve and shaft, although having their axes passing through the longitudinal axis of the strut, also have their axes inclined to the horizontal plane at the two different angles shown in FIGS. 5/5a and 6/6a. The vertically extending bore axes are shown in FIGS. 7 and 7a.

Figure 5:
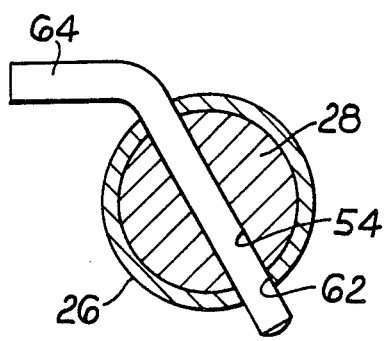
FIG. 5 is a transverse cross sectional view through the strut of FIGS. 3 and 4 showing the locking pin engaged in one set of aligned bores in the inner and outer members.
Figure 5A:
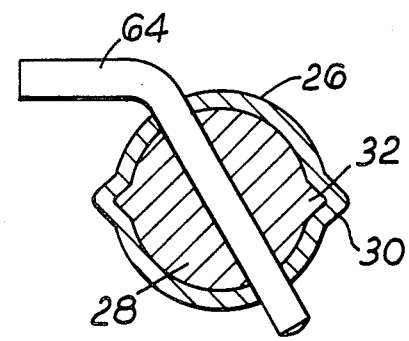
FIG. 5a is a similar view to that of FIG. 5 showing the non-rotatable means of engagement between the inner and outer members.
Figure 6:
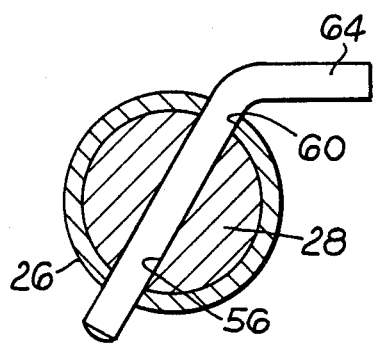
FIGS. 6 and 6a are similar views to those of FIGS. 5 and 5a respectively but showing the locking pin extending through a different set of aligned bores.
Figure 6A:
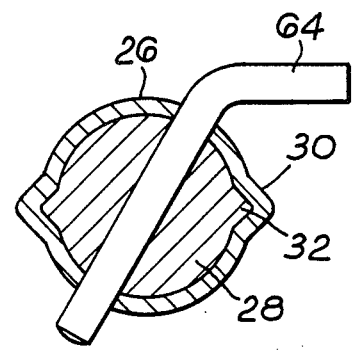

In other words, the bore 62 in the sleeve 26 forms a positively alignable set with the bore 54 in the shaft 28 as shown in FIGS. 5 and 5a. Similarly, the bore 60 in the sleeve forms a positively alignable set with the bore 56 in the shaft as shown in FIGS. 6 and 6a. From FIGS. 5/5a and 6/6a it wil be seen that the bore axes are respectively inclined at approximately plus 60 degrees and minus 60 degrees to the horizontal plane but with the bore axes passing through the longitudinal axis of the strut.

Figure 7:
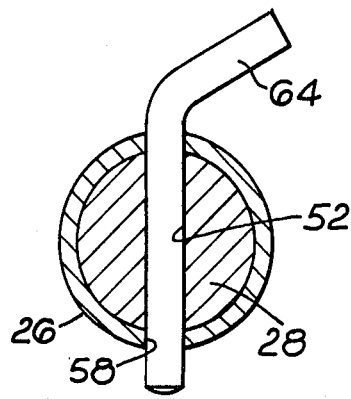
FIGS. 7 and 7a are again similar views to those of FIGS. 5 and 5a respectively showing the locking pin extending through a third set of aligned bores.
Figure 7A:
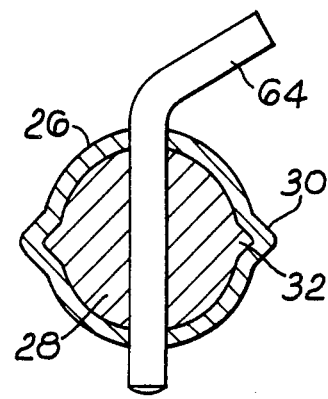

The bore axes shown in FIGS. 7 and 7a extend at 90 degrees to the horizontal plane and, again, pass through the longitudinal axis of the strut. Thus the position shown in FIGS. 7 and 7a corresponds to to the position of the locking pin 64 shown in FIGS. 3 and 4.

From FIGS. 3 and 4 it will be seen that the shaft 28 is provided with an additional vertically extending through bore 50 whereby, when the locking pin 54 is inserted through such bore (but not through any corresponding bores in the sleeve) movement of the shaft 28 relative to the sleeve 26 is only prevented inwardly thereof whilst permitting free outward telescopic movement of the shaft relative to the sleeve against the restraining action of the tension spring 40.

We claim:

1. An adjustable length strut for laterally supporting a lower steering arm of a three-point linkage of an agricultural tractor, comprising:

inner and outer elongate members telescopically and non-rotatably engaged with one another, one of said members being securable to the tractor and the other of said members being securable to said steering arm, the inner member having a plurality of first, axially-spaced through-bores each of which having a longitudinal axis inclined at a different angle relative to a reference plane containing the longitudinal axis of the inner member, and the outer member having a plurality of pairs of second aligned, axially-spaced through-bores, the axial spacing between the first through-bores being different from the axial spacing between the pairs of second through-bores, the longitudinal axes of each pair of second through-bores being inclined at a different angle relative to said reference plane, there being a pair of second through-bores with the longitudinally axes inclined to said plane at the same angle as each of the first through-bores so that each of said first and second through-bores with their axes at said same angle form a set whose bores can only be aligned with each other so that when aligned they may receive a locking pin to secure said members against relative to axial movement in a predetermined relative position which is differnet from each said set.

2. An adjustable length strut as claimed in claim 1 wherein the longitudinal axes of the alignable sets of bores in the inner and outer members extend through the longitudinal axis of the strut.

3. An adjustable length strut as claimed in claim 1 wherein the inner and outer members are spring biased axially towards one another by means of a tension spring.

4. An adjustable length strut as claimed in claim 1 wherein the inner and outer members are each provided with inter-engaging axially extending formations preventing relative rotation between said members.

5. A three point linkage as claimed in claim 6 wherein the longitudinal axes of the alignable sets of bores in the inner and outer members of the strut extend through the longitudinal axis of the strut.

6. A three-point linkage for an agricultural tractor, comprising two laterally spaced lower steering arms securable to the tractor and at least one adjustable length strut provided so as to laterally support one of said steering arms and being connected between said steering arm and the tractor, said strut comprising inner and outer elongated members telescopically and non-rotatably engaged with one another, one of the members being securable to the tractor and the other of the members being securable to said steering arm, the inner member having a plurality of first, axially-spaced through-bores each of which has a longitudinal axis inclined at a different angle relative to a reference plane containing the longitudinal axis of the inner member, and the outer member having a plurality of pairs of second aligned, axially-spaced through-bores, the axial spacing between the first through-bores being different from the axial spacing between the pairs of second through-bores, the longitudinal axis of each pair of second through-bores being inclined at a different angle to said reference plane, there being a pair of second through-bores with their longitudinal axes inclined to said plane at the same angle as each of the first through-bores so that each of said first and second through-bores with their axes at said same angle form a set having throughbores which can only be aligned with each other so that when aligned they may receive a locking pin to secure said members against relative axial movement in a predetermined relative position which is different from each said set.

7. A three point linkage as claimed in claim 6 wherein the inner and outer members of the strut are spring biased axially towards one another by means of a tension spring.

8. A three point linkage as claimed in claim 6 wherein the inner and outer members of the strut are each provided with inter-engaging axially extending formations preventing relative rotation between said members.

* * * * *